(12) United States Patent
Andersson et al.

(10) Patent No.: US 6,847,308 B2
(45) Date of Patent: Jan. 25, 2005

(54) VEHICLE PARKING SYSTEM

(75) Inventors: Hans Andersson, Molndal (SE);
Martin Apelryd, Gothenburg (SE)

(73) Assignee: Ford Motor Company, Dearborn, MI (US)

( * ) Notice: Subject to any disclaimer, the term of this patent is extended or adjusted under 35 U.S.C. 154(b) by 2 days.

(21) Appl. No.: 10/271,092

(22) Filed: Oct. 15, 2002

(65) Prior Publication Data

US 2003/0090393 A1 May 15, 2003

(30) Foreign Application Priority Data

Oct. 15, 2001 (EP) .............................. 01124580

(51) Int. Cl.⁷ .............................. B60Q 1/48
(52) U.S. Cl. .............................. 340/932.2; 340/995.24; 340/988
(58) Field of Search .............................. 340/932.2, 933, 340/995.24, 905, 988, 990; 701/209

(56) References Cited

U.S. PATENT DOCUMENTS

| | | | |
|---|---|---|---|
| 5,214,793 A | | 5/1993 | Conway et al. |
| 5,266,947 A | * | 11/1993 | Fujiwara et al. ......... 340/932.2 |
| 5,737,710 A | * | 4/1998 | Anthonyson ................. 701/1 |
| 5,748,107 A | * | 5/1998 | Kersken et al. ............ 340/905 |
| 5,910,782 A | * | 6/1999 | Schmitt et al. ........ 340/995.12 |
| 6,032,098 A | | 2/2000 | Takahashi et al. |
| 6,092,005 A | | 7/2000 | Okada |
| 6,161,071 A | | 12/2000 | Shuman et al. |
| 6,265,989 B1 | | 7/2001 | Taylor |
| 6,411,895 B1 | * | 6/2002 | Lau et al. ................... 701/209 |
| 6,583,734 B2 | * | 6/2003 | Bates et al. ................. 340/988 |

FOREIGN PATENT DOCUMENTS

| | | |
|---|---|---|
| DE | 10034109 C1 | 9/2001 |
| EP | 0661552 B1 | 12/1993 |
| EP | 0816802 A2 | 1/1998 |
| EP | 0978706 A2 | 2/2000 |
| EP | 1081668 A2 | 3/2001 |
| EP | 1087206 A1 | 3/2001 |
| JP | 10329576 | 12/1998 |
| WO | WO 0005091 | 2/2000 |

* cited by examiner

Primary Examiner—Anh V. La
(74) Attorney, Agent, or Firm—Brooks & Kushman, P.C.; Frank A. Mackenzie

(57) ABSTRACT

A parking system of a vehicle is disclosed. The parking system is connected with a position input connection, for receiving vehicle position information from a positioning system. The system comprises a map database for extracting map information related to parking information for at least one of a current parking section and a nearby area, based on the vehicle position information, and an output connection for providing, based on the extracted parking information, an alerting signal indicating the extracted parking information.

16 Claims, 1 Drawing Sheet

VEHICLE PARKING SYSTEM

TECHNICAL FIELD OF THE INVENTION

The invention relates to a vehicle parking system.

BACKGROUND OF THE INVENTION

When parking a vehicle there are often many different rules and regulations to take into account, depending on for example duration of parking, location of a parking space, time of the day and other. Sometimes the rules and regulations are quite complicated resulting in that it is not evident for a driver of a vehicle what needs to be done in order to park a vehicle in accordance with rules and regulations. Failure to comply with these rules and regulations for parking could many times lead to that fines have to be paid. It is quite often considered difficult to know or get to know exactly what rules are applicable in the exact location at a certain time.

In addition to a risk of being fined the difficulty in knowing what rules to follow, especially if the driver is in an unfamiliar area, region or country, could lead to unexpected and undesirable consequences due to lack of knowledge of a language or of the mentioned area, region, etc., in which the vehicle is parked. For example, there are areas with a higher rate of burglary in parked vehicles than in other areas. Parking a vehicle in such an area might lead to damage to the vehicle or even loss of property left in the vehicle.

SUMMARY OF THE INVENTION

Consequently, the object of the present invention is to provide a parking system and a vehicle comprising said system, providing a flexible solution in order to be able to avoid the above mentioned issues related to parking of the vehicle.

According to the invention the above object is achieved by a parking system of a vehicle, said parking system being connected with a position input connection, for receiving vehicle position information from a positioning system, said system comprising a map database for extracting map information related to parking information for at least one of a current parking section and a nearby area, based on said vehicle position information, and an output connection for providing, based on said extracted parking information, an alerting signal indicating said extracted parking information.

Preferably said extracted information, from the map database, is related to at least one of the following categories, parking regulations, such as parking time limits, parking fees, and additional regulations related to vehicles in a specific physical zone, in which zone the vehicle is currently being operated or parked.

By taking data from a physical zone into consideration it can be assured that other information than actual parking information but still relevant for the parked vehicle will be provided in order to provide information on whether the parking of the vehicle is in accordance with rules and regulations of the present physical zone.

Furthermore, it is possible to add information related to date and time in the map database, thus ensuring that the vehicle is parked in accordance with regulations and prevailing conditions within the said physical zone.

Advantageously the map database also comprises information related to a risk for burglary or destruction of a parked vehicle within a physical zone. This parking information is preferably based on statistic information regarding such events in a certain area and may be indicated by the system in a number of ways. If the risk is presented for example as high it might be unsuitable to leave the vehicle unattended over night, storing valuable goods within the vehicle etc.

According to an embodiment of the invention, the map database is provided on-board the vehicle. This is advantageous since the time for retrieving road section information is shortened as compared to an outer map database, thus contributing to minimize the response time of the entire system. Further, the on-board location ensures continuous contact with the parking system and thus a stable performance.

Preferably the output connection presents the parking information for at least a driver of the vehicle in at least one of the following manners, audible, and visible on a display. According to a preferred embodiment said parking information is presented in a selectable language, making it possible for a driver or a passenger of the vehicle to be noticed about parking regulations or the like in a preferred language independent of where the vehicle currently is being operated.

The output connection of the parking system according to an embodiment of the invention provides information related to the position of usable parking meters adjacent said vehicle. Hence, any hesitation or insecurity regarding where correct fee for parking is to be paid is reduced.

Advantageously, the output connection provides a warning signal if said vehicle is parked in a position where there is a lack of parking information in the map database. This is to inform persons in the vehicle that parking information from the parking system might be insufficient in the actual parking space and that parking information may have to be received elsewhere.

According to a preferred embodiment of the parking system said output connection provides information related to a maximum allowable consecutive parking time in a specific position. It could of course be presented in a number of different ways such as for example the time when the vehicle has to be removed due to any regulations.

The above mentioned object is also achieved by a vehicle comprising said parking system characterised in the system being connected with a position input connection, for receiving vehicle position information from a positioning system, said system comprising a map database for extracting map information related to parking information for at least one of a current parking section and a nearby area, based on said vehicle position information, and an output connection for providing, based on said extracted parking information, an alerting signal indicating said extracted parking information.

BRIEF DESCRIPTION OF THE DRAWINGS

A currently preferred embodiment of the present invention will now be described in closer detail, with reference to the accompanying drawings.

DETAILED DESCRIPTION OF THE PREFERRED EMBODIMENTS OF THE INVENTION

Figure 1:
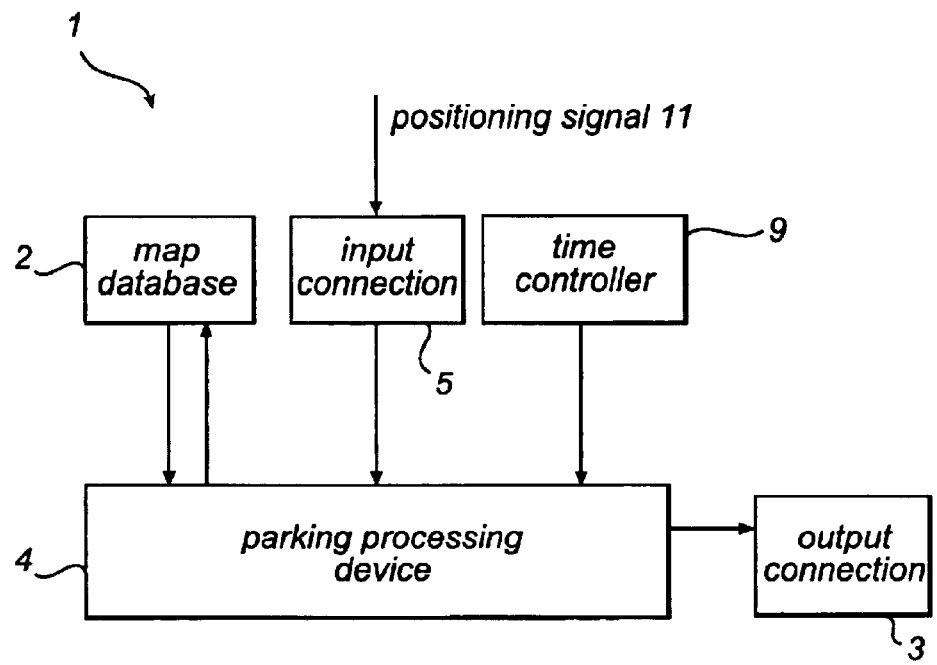
FIG. 1 is a block diagram of one preferred embodiment of the invention.
Figure 2:
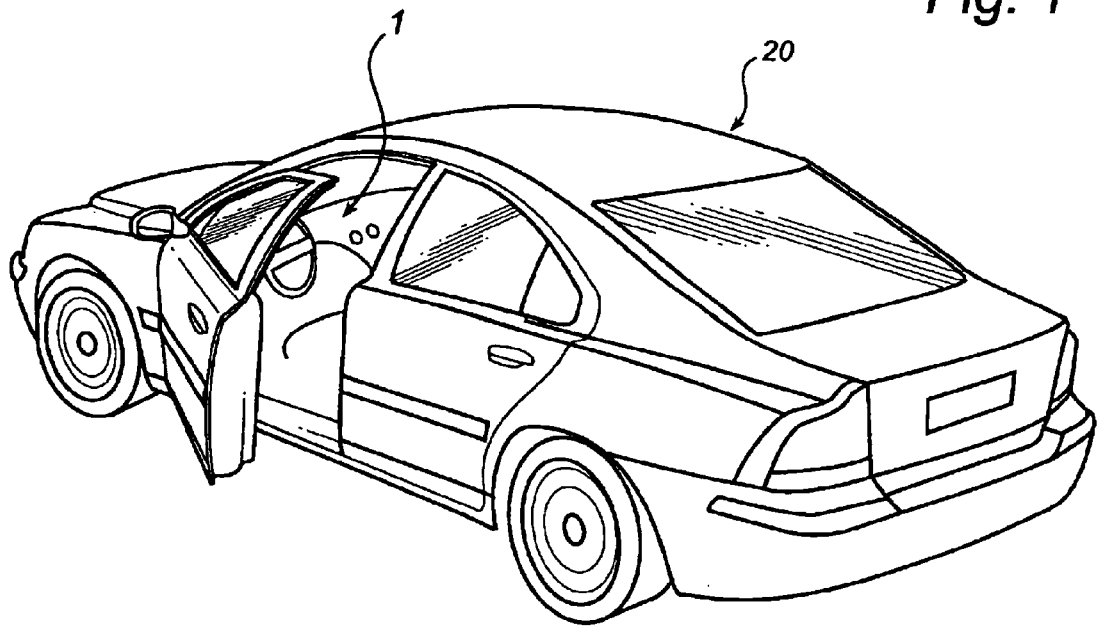
FIG. 2 is perspective view of a vehicle with an installed parking system according to the invention.

A system in accordance with a first embodiment of the invention is shown in FIG. 1. The parking system 1 comprises a processing device 4. Furthermore, a map database 2 and an input connection 5 for receiving a positioning signal 11 such as a GPS signal, are connected with said parking system 1. Information from the map database 2 and the positioning signal 11 are arranged to be inputted to said processing device 4. The parking processing device 4 could according to an embodiment of the invention form part of a central processing device of the vehicle.

When a user drives the vehicle in a road section a geographical positioning signal 11, such as a GPS signal, locating the vehicle, is picked up and inputted through the input connection 5 to the processing device 4. Thereafter map information from said map database 2, relating to the current and/or the nearby zone, based on said positioning signal 11, is loaded into the parking processing device 4. Consequently, positioning information and map information are loaded into said processing device 4. The processing device 4 will generate a signal comprising information to the output connection 3. The map database includes not only road configurations, but also relevant data regarding parking regulations and other information to be used, as further described herein.

The information is transmitted to the output connection 3 for notifying appropriate parking information to at least the driver of the vehicle 20. The alert signal could for example be presented on a display, as a sound etc.

The parking system 1 may be set in at least two different information presenting modes, an autonomous parking information presenting mode, in which the parking information for the vehicle is automatically presented, and a driver information mode, in which for example the driver chooses when the information is needed from the parking system 1. The autonomous information presenting mode is preferably activated by a predetermined action such as a parking brake being activated or when the parking system 1 identifies a parking space in a position where the vehicle is stopped.

Also, a time controller 9 is suitably connected with said map database 2, as shown in FIG. 1. Thereby, it is possible to further adjust the parking system, based also on the position of the vehicle, by considering date and time related factors, which may have an impact on parking regulations. Such regulations may include whether parking is now allowed or not allowed; whether, if parking is now allowed it will not be allowed in the near future (for example, within the next several minutes or hours) which may impact the driver who is planning now to park the vehicle; present parking fees; and changes in per-hour parking fees which may occur in the near future (for example, within the next several minutes or hours) which may impact the driver who is planning now to park the vehicle.

The map database 2 could be arranged and stored away from the vehicle and hence use wireless connection to transmit the information to said vehicle. The map database 2 is then advantageously used as a central map database 2 by a plurality of parking systems. Preferably, the map database 2 is provided on-board the vehicle. The onboard location ensures continuous contact with the parking system and thus a stable performance.

EXAMPLES

In the following a few non-limiting examples of situations where the invention may be used will be described.

When a vehicle, comprising said parking system, is to be parked information in a pre-selected language regarding maximum allowable consecutive parking time for the desired parking space position is indicated. In addition information related to parking fees at the selected parking space may be presented (including the total fees which would be required to park for various amounts of time) together with directions on how and where to pay the parking fees.

When traveling in an unfamiliar area, region or country, it could often lead to unexpected and undesirable consequences due to lack of knowledge of a language or of the mentioned area, region, etc., in which the vehicle is parked. For example, there are areas with a higher rate of burglary in parked vehicles than in other areas. Parking a vehicle in such an area might lead to damage on the vehicle or even loss of property left in the vehicle. According to a preferred embodiment of the invention information related to the likelihood of vehicle break-in in an area is presented. Appropriate measures could than be taken in order to minimize or eliminate a risk for burglary or damage to the vehicle.

By taking data from a physical zone into consideration it can be assured that information other than actual parking information but still relevant for the parked vehicle will be provided in order to provide information on whether the parking of the vehicle is in accordance with rules and regulations of the present physical zone. Furthermore, it is possible to add information related to date and time in the map database 2, thus ensuring that the vehicle is parked in accordance with regulations and prevailing conditions within the said physical zone.

For example in some countries during winter it is considered necessary to have winter tires on a vehicle. In some zones in such countries a penalty fee for using winter tires on city roads should be paid and a receipt is to be presented in the vehicle visible from the outside. A parked vehicle with winter tires failing to present a visible penalty fee receipt could be fined. According to an embodiment of the invention the parking system will present an alerting signal, in addition to presenting the prevailing parking rules and regulations, indicating that a penalty fee receipt for winter tires is necessary. Advantageously directions to the nearest place for collecting said penalty fee receipt for winter tires are presented by the parking system.

The present invention should not be considered as being limited to the above-described embodiment, but rather includes all possible variations covered by the scope defined by the appended claims.

For example, many different combinations of the above-described features are possible, since most of them, such as the use of a time controller 14 and the inclusion of information on display, are independent from each other. Furthermore, it is possible to regularly update the on-board map database 2, by means of a GSM connection or other means of information transfer.

What is claimed is:

1. A parking system of a vehicle comprising: a position input connection for receiving an approximate vehicle position from a positioning system, a map database for extracting a plurality of map information, said plurality of map information comprising a plurality of parking information that at least includes information relating to time-based availability of parking spaces and being related to said approximate vehicle position, and an output connection for providing an alerting signal to at least a driver of said vehicle, said alerting signal being related to said plurality of map information, a processor for controlling the alerting signal, the processor including an autonomous parking information presentation mode for automatically providing the alerting signal if a parking brake of the vehicle is activated or if the processor identifies a parking space in a position where the vehicle is stopped.

2. The system of claim 1, wherein said plurality of parking information is related to parking regulations.

3. The system of claim 1, wherein said plurality of parking information is related to parking time limits.

4. The system of claim 1, wherein said plurality of parking information is related to parking fees.

5. The system of claim 1, wherein said plurality of parking information is related to a likelihood of burglary or damage to a parked vehicle.

6. The system of claim 1, wherein said alerting signal comprises a visual display.

7. The system of claim 1, wherein said alerting signal is a sound or a display.

8. The system of claim 1, wherein said plurality of parking information is related to a position of usable parking meters.

9. The system of claim 1, wherein said plurality of parking information is related to a maximum allowable consecutive parking time in a specific vehicle position.

10. The system of claim 1, wherein said plurality of parking information is related to a change of status of a proposed parking location.

11. The system of claim 1, wherein said map database is on-board said vehicle.

12. The system of claim 1, wherein said plurality of parking information is related to when a currently closed parking lot will be available for parking.

13. The system of claim 1, wherein said plurality of parking information is related to changes in per-hour parking fees.

14. The system of claim 1, wherein said plurality of parking information is related to total fees required to park for a period of time.

15. A parking system of a vehicle comprising:

a position input connection for receiving an approximate vehicle position from a positioning system;

a map database for extracting a plurality of map information, said plurality of map information comprising a plurality of parking information and being related to said approximate vehicle position;

an output connection for providing an alerting signal to at least a driver of said vehicle, said alerting signal being related to said plurality of map information;

wherein said plurality of parking information is related at least in part to total fees required to park for a period of time; and a processor for controlling the alerting signal, the processor including an autonomous parking information presentation mode for automatically providing the alerting signal if a parking brake of the vehicle is activated or if the processor identifies a parking space in a position where the vehicle is stopped.

16. A parking system of a vehicle comprising:

a position input connection for receiving an approximate vehicle position from a positioning system;

a map database for extracting a plurality of map information, said plurality of map information comprising a plurality of parking information and being related to said approximate vehicle position;

an output connection for providing an alerting signal to at least a driver of said vehicle, said alerting signal being related to said plurality of map information; and wherein said plurality of parking information is related at least in part to rules and regulations of a present physical zone of the vehicle, the rules and regulations being different from rules and regulations associated with parking of the vehicle.

* * * * *